(12) United States Patent
Singh et al.

(10) Patent No.: US 7,098,176 B2
(45) Date of Patent: Aug. 29, 2006

(54) AZEOTROPE-LIKE COMPOSITIONS OF TETRAFLUOROPROPENE AND PENTAFLUOROPROPENE

(75) Inventors: Rajiv R. Singh, Getzville, NY (US); Hang T. Pham, Amherst, NY (US); David P. Wilson, East Amherst, NY (US); Raymond H. Thomas, Pendleton, NY (US); David Nalewajek, West Seneca, NY (US)

(73) Assignee: Honeywell International Inc., Morristown, NJ (US)

( * ) Notice: Subject to any disclaimer, the term of this patent is extended or adjusted under 35 U.S.C. 154(b) by 231 days.

(21) Appl. No.: 10/826,597

(22) Filed: Apr. 16, 2004

(65) Prior Publication Data

US 2005/0233932 A1    Oct. 20, 2005

(51) Int. Cl.
*C11D 7/50* (2006.01)
(52) U.S. Cl. ............ 510/408; 510/412; 510/415; 252/67
(58) Field of Classification Search .......... None
See application file for complete search history.

(56) References Cited

U.S. PATENT DOCUMENTS

| 3,723,318 A | 3/1973 | Butler |
| 5,182,040 A | 1/1993 | Bartlett et al. ............ 252/67 |
| 5,380,449 A | 1/1995 | Thomas et al. ............ 252/68 |
| 5,611,210 A | 3/1997 | Nimitz et al. ............ 62/114 |
| 5,648,017 A | 7/1997 | Bartlett et al. ............ 252/67 |
| 5,716,549 A | 2/1998 | Nimitz et al. ............ 252/364 |
| 6,858,571 B1 * | 2/2005 | Pham et al. ............ 510/408 |
| 6,969,701 B1 * | 11/2005 | Singh et al. ............ 510/412 |

FOREIGN PATENT DOCUMENTS

| WO | WO 98/37043 A | 8/1998 |
| WO | WO 02/059231 | 8/2002 |
| WO | WO2004/037913 | 5/2004 |

* cited by examiner

*Primary Examiner*—Gregory Webb
(74) *Attorney, Agent, or Firm*—Colleen D. Szuch

(57) ABSTRACT

Provided are azeotrope-like compositions comprising tetrafluoropropene and pentafluoropropene and uses thereof, including use in refrigerant compositions, refrigeration systems, blowing agent compositions, and aerosol propellants.

17 Claims, No Drawings

AZEOTROPE-LIKE COMPOSITIONS OF TETRAFLUOROPROPENE AND PENTAFLUOROPROPENE

CROSS-REFERENCES TO RELATED APPLICATIONS

This application claims the benefit of priority to Provisional Application Ser. No. 60/563,085, filed on Apr. 16, 2004 and to the U.S. Regular Applications bearing Ser. Nos. 10/826,811; 10/826,072; 10/826,727 and 10/826,592, all of which were filed on Apr. 16, 2004, are now pending, and are incorporated herein by reference.

FIELD OF INVENTION

The present invention provides azeotrope-liked compositions of 1,1,1,2-tetrafluoropropene and the Z-isomer of 1,1,1,2,3-pentafluoropropene, and uses therof.

BACKGROUND

Fluorocarbon based fluids have found widespread use in industry in a number of applications, including as refrigerants, aerosol propellants, blowing agents, heat transfer media, and gaseous dielectrics. Because of the suspected environmental problems associated with the use of some of these fluids, including the relatively high global warming potentials associated therewith, it is desirable to use fluids having low or even zero ozone depletion potential, such as hydrofluorocarbons ("HFCs"). Thus, the use of fluids that do not contain chlorofluorocarbons ("CFCs") or hydrochlorofluorocarbons ("HCFCs") is desirable. Additionally, the use of single component fluids or azeotropic mixtures, which do not fractionate on boiling and evaporation, is desirable. However, the identification of new, environmentally-safe, non-fractionating mixtures is complicated due to the fact that azeotrope formation is not readily predictable.

The industry is continually seeking new fluorocarbon based mixtures that offer alternatives, and are considered environmentally safer substitutes for CFCs and HCFCs. Of particular interest are mixtures containing both hydrofluorocarbons and other fluorinated compounds, both of low ozone depletion potentials. Such mixtures are the subject of this invention.

DESCRIPTION OF PREFERRED EMBODIMENTS

The present inventors have developed several compositions that help to satisfy the continuing need for alternatives to CFCs and HCFCs. According to certain embodiments, the present invention provides azeotrope-like compositions comprising 1,1,1,2-tetrafluoropropene ("HFO-1234yf") and (Z)-1,1,1,2,3-pentafluoropropene ("HFO-1225yez").

The preferred compositions of the invention tend both to be non-flammable and to exhibit relatively low global warming potentials ("GWPs"). Accordingly, applicants have recognized that such compositions can be used to great advantage in a number of applications, including as replacements for CFCs, HCFCs, and HFCs (such as HFC-134a) in refrigerant, aerosol, and other applications.

Additionally, applicants have recognized surprisingly that azeotrope-like compositions of HFO-1234yf and HFO-1225yez can be formed. Accordingly, in other embodiments, the present invention provides methods of producing an azeotrope-like composition comprising combining HFO-1234ze and HFO-1225yez in amounts effective to produce an azeotrope-like composition.

In addition, applicants have recognized that the azeotrope-like compositions of the present invention exhibits properties that make that make them advantageous for use as, or in, refrigerant compositions. Accordingly, in yet other embodiments, the present invention provides refrigerant compositions comprising an azeotrope-like composition of HFO-1234yf and HFO-1225yez.

Azeotrope-like Compositions

As used herein, the term "azeotrope-like" is intended in its broad sense to include both compositions that are strictly azeotropic and compositions that behave like azeotropic mixtures. From fundamental principles, the thermodynamic state of a fluid is defined by pressure, temperature, liquid composition, and vapor composition. An azeotropic mixture is a system of two or more components in which the liquid composition and vapor composition are equal at the stated pressure and temperature. In practice, this means that the components of an azeotropic mixture are constant-boiling and cannot be separated during a phase change.

The azeotrope-like compositions of the invention may include additional components that do not form new azeotrope-like systems, or additional components that are not in the first distillation cut. The first distillation cut is the first cut taken after the distillation column displays steady state operation under total reflux conditions. One way to determine whether the addition of a component forms a new azeotrope-like system so as to be outside of this invention is to distill a sample of the composition with the component under conditions that would be expected to separate a non-azeotropic mixture into its separate components. If the mixture containing the additional component is non-azeotrope-like, the additional component will fractionate from the azeotrope-like components. If the mixture is azeotrope-like, some finite amount of a first distillation cut will be obtained that contains all of the mixture components that is constant boiling or behaves as a single substance.

It follows from this that another characteristic of azeotrope-like compositions is that there is a range of compositions containing the same components in varying proportions that are azeotrope-like or constant boiling. All such compositions are intended to be covered by the terms "azeotrope-like" and "constant boiling". As an example, it is well known that at differing pressures, the composition of a given azeotrope will vary at least slightly, as does the boiling point of the composition. Thus, an azeotrope of A and B represents a unique type of relationship, but with a variable composition depending on temperature and/or pressure. It follows that, for azeotrope-like compositions, there is a range of compositions containing the same components in varying proportions that are azeotrope-like. All such compositions are intended to be covered by the term azeotrope-like as used herein.

It is well-recognized in the art that it is not possible to predict the formation of azeotropes. (See, for example, U.S. Pat. No. 5,648,017 (column 3, lines 64–65) and U.S. Pat. No. 5,182,040 (column 3, lines 62–63), both of which are incorporated herein by reference). Applicants have discovered unexpectedly that HFO-1234ze and $CF_3I$ form azeotrope-like compositions.

According to certain preferred embodiments, the azeotrope-like compositions of the present invention comprise, and preferably consist essentially of, effective azeotrope-like amounts of HFO-1234yf and HFO-1225yez. The term "effective azeotrope-like amounts" as used herein refers to the amount of each component which upon combination with the other component, results in the formation of an azeotrope-like composition of the present invention. Preferably, the present azeotrope-like compositions comprise, and preferably consist essentially of, from about 50 to less than 100 weight percent HFO-1234yf and from greater than zero to about 50 weight percent of HFO-1225yez. More preferably, the azeotrope-like compositions comprise, and preferably consist essentially of, from about 65 to less than 100 weight percent HFO-1234yf and from greater than zero to about 35 weight percent of HFO-1225yez, more preferably from about 85 to less than 100 weight percent HFO-1234yf and from greater than zero to about 15 weight percent of HFO-1225yez, and even more preferably from about 93 to less than 100 weight percent HFO-1234yf and from greater than zero to about 7 weight percent of HFO-1225yez. Unless otherwise indicated, the weight percents disclosed herein are based on the total weight of HFO-1225yez and HFO-1234yf in a composition.

The azeotrope-like compositions described herein preferably have a boiling point of from about −26° C. to about −30° C. at a pressure of about 14.2 psia. In certain more preferred embodiments, the present azeotrope-like compositions have a boiling point of from about −27° C. to about −30° C. at a pressure of about 14.2 psia, and in even more preferred embodiments, from about −28° C. to about −29.5° C. at a pressure of about 14.2 psia.

The azeotrope-like compositions of the present invention can be produced by combining effective azeotrope-like amounts of HFO-1234yf and HFO-1225yez. Any of a wide variety of methods known in the art for combining two or more components to form a composition can be adapted for use in the present methods to produce an azeotrope-like composition. For example, HFO-1234yf and HFO-1225yez can be mixed, blended, or otherwise contacted by hand and/or by machine, as part of a batch or continuous reaction and/or process, or via combinations of two or more such steps. In light of the disclosure herein, those of skill in the art will be readily able to prepare azeotrope-like compositions according to the present invention without undue experimentation.

The azeotrope-like compositions of the present invention may further include any of a variety of optional additives including stabilizers, metal passivators, corrosion inhibitors, and the like.

Uses of the Compositions

The present compositions have utility in a wide range of applications. For example, one embodiment of the present invention relates to refrigerant compositions comprising the present azeotrope-like compositions.

The refrigerant compositions of the present invention may be used in any of a wide variety of refrigeration systems including air-conditioning, refrigeration, heat-pump, HVAC systems, and the like. In certain preferred embodiments, the compositions of the present invention are used in refrigeration systems originally designed for use with an HFC refrigerant, such as, for example, HFC-134a. The preferred compositions of the present invention tend to exhibit many of the desirable characteristics of HFC-134a and other HFC refrigerants, including a GWP that is as low, or lower than that of conventional HFC refrigerants and a capacity that is as high or higher than such refrigerants. In addition, the relatively constant boiling nature of the compositions of the present invention makes them even more desirable than certain conventional HFCs for use as refrigerants in many applications.

In certain other preferred embodiments, the present compositions are used in refrigeration systems originally designed for use with a CFC-refrigerant. Preferred refrigeration compositions of the present invention may be used in refrigeration systems containing a lubricant used conventionally with CFC-refrigerants, such as mineral oils, silicone oils, polyalkylene glycol oils, and the like, or may be used with other lubricants traditionally used with HFC refrigerants. As used herein the term "refrigeration system" refers generally to any system or apparatus, or any part or portion of such a system or apparatus, which employs a refrigerant to provide cooling. Such refrigeration systems include, for example, air conditioners, electric refrigerators, chillers, transport refrigeration systems, commercial refrigeration systems and the like.

Any of a wide range of methods for introducing the present refrigerant compositions to a refrigeration system can be used in the present invention. For example, one method comprises attaching a refrigerant container to the low-pressure side of a refrigeration system and turning on the refrigeration system compressor to pull the refrigerant into the system. In such embodiments, the refrigerant container may be placed on a scale such that the amount of refrigerant composition entering the system can be monitored. When a desired amount of refrigerant composition has been introduced into the system, charging is stopped. Alternatively, a wide range of charging tools, known to those of skill in the art, is commercially available. Accordingly, in light of the above disclosure, those of skill in the art will be readily able to introduce the refrigerant compositions of the present invention into refrigeration systems according to the present invention without undue experimentation.

According to certain other embodiments, the present invention provides refrigeration systems comprising a refrigerant of the present invention and methods of producing heating or cooling by condensing and/or evaporating a composition of the present invention. In certain preferred embodiments, the methods for cooling an article according to the present invention comprise condensing a refrigerant composition comprising an azeotrope-like composition of the present invention and thereafter evaporating said refrigerant composition in the vicinity of the article to be cooled. Certain preferred methods for heating an article comprise condensing a refrigerant composition comprising an azeotrope-like composition of the present invention in the vicinity of the article to be heated and thereafter evaporating said refrigerant composition. In light of the disclosure herein, those of skill in the art will be readily able to heat and cool articles according to the present inventions without undue experimentation.

In another embodiment, the azeotrope-like compositions of this invention may be used as propellants in sprayable compositions, either alone or in combination with known propellants. The propellant composition comprises, more preferably consists essentially of, and, even more preferably, consists of the azeotrope-like compositions of the invention. The active ingredient to be sprayed together with inert ingredients, solvents, and other materials may also be present in the sprayable mixture. Preferably, the sprayable composition is an aerosol. Suitable active materials to be sprayed include, without limitation, cosmetic materials such as deodorants, perfumes, hair sprays, cleansers, and polishing agents as well as medicinal materials such as anti-asthma and anti-halitosis medications.

Yet another embodiment of the present invention relates to a blowing agent comprising one or more azeotrope-like compositions of the invention. In other embodiments, the invention provides foamable compositions, and preferably polyurethane and polyisocyanurate foam compositions, and methods of preparing foams. In such foam embodiments, one or more of the present azeotrope-like compositions are included as a blowing agent in a foamable composition, which composition preferably includes one or more additional components capable of reacting and foaming under the proper conditions to form a foam or cellular structure, as is well known in the art. Any of the methods well known in the art, such as those described in "Polyurethanes Chemistry and Technology," Volumes I and II, Saunders and Frisch, 1962, John Wiley and Sons, New York, N.Y., which is incorporated herein by reference, may be used or adapted for use in accordance with the foam embodiments of the present invention.

Other uses of the present azeotrope-like compositions include use as solvents, cleaning agents, and the like. Those of skill in the art will be readily able to adapt the present compositions for use in such applications without undue experimentation.

EXAMPLE

The invention is further illustrated in the following example which is intended to be illustrative, but not limiting in any manner.

Example 1

An ebulliometer consisting of vacuum jacketed tube with a condenser on top which is further equipped with a Quartz Thermometer K96S4771 is used. About 17 g HFO-1234yf is charged to the ebulliometer and then HFO-1225yez is added in small, measured increments. Temperature depression is observed when HFO-1225yez is added to HFO-1234yf, indicating a binary minimum boiling azeotrope is formed. From greater than about 0 to about 50 weight percent HFO-1225yez, the boiling point of the composition changed by about 3° C. or less. The binary mixtures shown in Table 1 were studied and the boiling point of the compositions changed by about 3° C. or less. The compositions exhibit azeotrope and/or azeotrope-like properties over this range.

TABLE 1

HFO-1234yf/HFO-1225yez compositions at 14.2 psia

| Wt. % HFO-1234yf | Wt. % HFO-1225yez | Temperature (° C.) |
|---|---|---|
| 100.00 | 0.00 | −28.863 |
| 96.57 | 3.43 | −29.108 |
| 93.58 | 6.42 | −28.765 |
| 88.25 | 11.75 | −28.588 |
| 80.94 | 19.06 | −28.372 |
| 73.76 | 26.24 | −27.989 |
| 66.59 | 33.41 | −27.684 |
| 55.74 | 44.26 | −26.803 |
| 50.50 | 49.50 | −26.214 |
| 47.40 | 52.60 | −25.870 |

What is claimed is:

1. An azeotrope-like composition comprising effective amounts of HFO-1234yf and HFO-1225yez.

2. The azeotrope-like composition of claim 1 which consists essentially of from about 50 to less than 100 weight percent HFO-1234yf and from greater than zero to about 50 weight percent of HFO-1225yez.

3. The azeotrope-like composition of claim 1 which consists essentially of from about 65 to less than 100 weight percent HFO-1234yf and from greater than zero to about 35 weight percent of HFO-1225yez.

4. The azeotrope-like composition of claim 1 which consists essentially of from about 85 to less than 100 weight percent HFO-1234yf and from greater than zero to about 15 weight percent of HFO-1225yez.

5. The azeotrope-like composition of claim 1 which consists essentially of from about 93 to less than 100 weight percent HFO-1234yf and from greater than zero to about 7 weight percent of HFO-1225yez.

6. The azeotrope-like composition of claim 1 having a boiling point of from about −26° C. to about −30° C. at a pressure of about 14.2 psia.

7. The azeotrope-like composition of claim 1 having a boiling point of from about −27° C. to about −30° C. at a pressure of about 14.2 psia.

8. The azeotrope-like composition of claim 1 having a boiling point of from about −28° C. to about −29.5° C. at a pressure of about 14.2 psia.

9. The composition of claim 1 further comprising a lubricant.

10. The composition of claim 9 wherein said lubricant is selected from the group consisting of mineral oil, alkyl benzenes, polyol esters, polyalkylene glycols, and combinations of two or more thereof.

11. A refrigerant composition comprising an azeotrope-like composition of claim 1.

12. A refrigeration system comprising a refrigerant of claim 11.

13. A method for cooling an article which comprises condensing a refrigerant composition of claim 11 and thereafter evaporating said refrigerant composition in the vicinity of the article to be cooled.

14. A method for heating an article which comprises condensing a refrigerant composition of claim 11 in the vicinity of the article to be heated and thereafter evaporating said refrigerant composition.

15. A sprayable composition comprising a material to be sprayed and a propellant comprising an azeotrope-like composition of claim 1.

16. A sprayable composition according to claim 15 wherein the sprayable composition is an aerosol.

17. A blowing agent comprising an azeotrope-like composition of claim 1.

* * * * *